United States Patent [19]

Dulberger et al.

[11] 4,353,604
[45] Oct. 12, 1982

[54] VISCOUS/FRICTION DAMPER

[75] Inventors: Michael D. Dulberger, Manchester; David H. Hibner, Colchester; Donald C. Moringiello, Windsor, all of Conn.

[73] Assignee: United Technologies Corporation, Hartford, Conn.

[21] Appl. No.: 215,299

[22] Filed: Dec. 11, 1980

[51] Int. Cl.³ .................. F16C 23/08; F16C 27/04
[52] U.S. Cl. .................. 308/184 A; 308/184 R; 415/113
[58] Field of Search .......... 308/9, 22, 26, 184 R, 308/184 A, 207 R, DIG. 15; 415/113, 170 R, 174

[56] References Cited

U.S. PATENT DOCUMENTS

| | | | |
|---|---|---|---|
| 3,163,353 | 12/1964 | Petrie | 308/184 R |
| 3,357,757 | 12/1967 | Morley et al. | 308/184 R |
| 3,456,992 | 7/1969 | Kulina | 308/184 R |
| 3,727,998 | 4/1973 | Haworth et al. | 308/184 R |
| 3,756,672 | 9/1973 | Hibner et al. | 308/184 R |
| 3,910,651 | 10/1975 | Pearce et al. | 308/184 R |
| 4,046,430 | 9/1977 | Buono et al. | 308/184 R |
| 4,084,861 | 4/1978 | Greenberg et al. | 308/184 R |
| 4,175,803 | 11/1979 | Roberts | 308/184 R |
| 4,214,796 | 7/1980 | Monzel et al. | 308/184 R |
| 4,289,360 | 9/1981 | Zirin | 308/207 R |

FOREIGN PATENT DOCUMENTS

| | | | |
|---|---|---|---|
| 556981 | 12/1974 | Switzerland | 308/DIG. 15 |
| 2043791 | 10/1980 | United Kingdom | 415/113 |

*Primary Examiner*—Richard R. Stearns
*Attorney, Agent, or Firm*—Norman Friedland

[57] ABSTRACT

A friction damper is mounted in series with a viscous damper to accommodate the normal magnitude vibration and the higher magnitude vibration occasioned from a larger imbalance of a jet engine rotor manifested by a bowed rotor and including a loading spring to allow the recentering of said friction damper when the higher magnitude vibrations subside.

5 Claims, 1 Drawing Figure

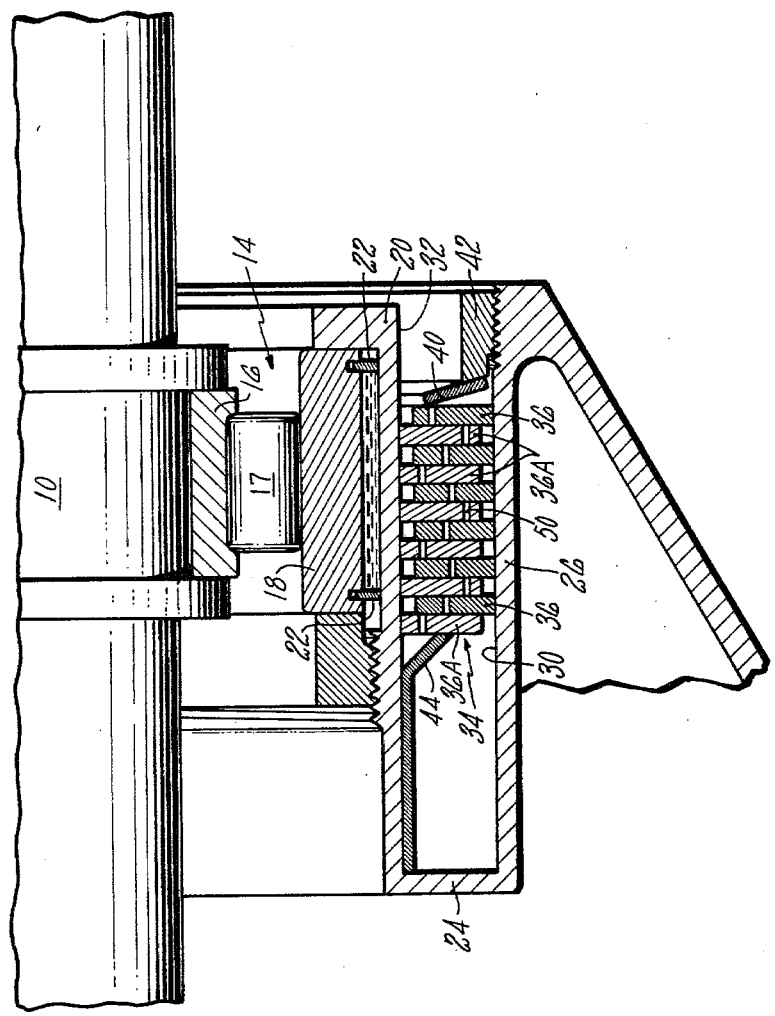

VISCOUS/FRICTION DAMPER

CROSS REFERENCE

This patent application relates to the damper of the type disclosed in U.S. Patent Applications filed by D. C. Moringiello and S. H. Dallman and D. H. Hibner filed on even date and entitled Friction Damper and Viscous/Friction Damper, respectively, and assigned to the same assignee as this patent application.

DESCRIPTION

1. Technical Field

This invention relates to rotors for gas turbine engines and particularly to dampers therefor.

2. Background Art

U.S. Pat. No. 3,756,672 filed by R. J. Comeau and myself on Sept. 4, 1973 and assigned to the same assignee as this patent application describes a viscous damper and for further details, reference should be made thereto.

The viscous damper serves to impede the vibratory motion that is manifested by the rotor imbalance. Oil is squeezed between the whirling cylindrical surface and a stationary cylindrical support pedestal. The gap therebetween is established by the required load and damping characteristics of the system. It is desirable to maintain the gap as small as possible to limit rotor excursions so that the tips of the attached blades do not touch the adjacent seals or casing. These design considerations therefore are limited to handle the normal vibratory responses occasioned by typical rotor imbalance to which the engine is subjected. It therefore, is not capable of handling the heavier loads that are manifested by blade loss or the like.

I have found that I can obviate this problem by providing a friction damper discretely located and mounted in series with the viscous damper, so that any load above a certain threshold is handled by the friction damper and until that load is exceeded, the friction damper is rendered inoperative. A constant load is imposed on the friction plates by a spring so that the plates are recentered by the centering spring when the load imposed by the rotor has subsided. The centering spring serves to tune the bowed rotor frequency when the damper is used. Obviously, since the friction plates are designed for a moderate load multicycle application, oil is continuously fed to the plates.

DISCLOSURE OF INVENTION

An object of this invention is to provide for a rotor an improved damper system.

A feature of this invention is judiciously locating a friction damper in series relationship to a viscous damper to dampen loads exceeding the loads normally handled by the viscous damper. The friction damper is mounted concentric to the viscous damper and a centering spring and load spring serve to recenter the friction plates when the load imposed by a bowed rotor subsides.

Other features and advantages will be apparent from the specification and claims and from the accompanying drawing which illustrates an embodiment of the invention.

BRIEF DESCRIPTION OF DRAWING

The sole FIGURE is a partial sectional view of a shaft of a rotor rotatably supported by a bearing damped by the viscous/friction damper of this invention.

BEST MODE FOR CARRYING OUT THE INVENTION

As shown in the sole FIGURE, shaft 10 is rotatably supported by the roller bearing generally indicated by reference numeral 14. Bearing 14 comprises an inner race 16, outer race 18 sandwiching a plurality of circumferentially spaced rollers 17 (one being shown).

While this bearing support system is for a jet engine as is exemplified in the model TF-30 jet engine manufactured by Pratt & Whitney Aircraft Group of United Technologies Corporation, the assignee of this patent application and which is incorporated by reference, it is to be understood that the invention has application for other rotor systems. The outer diameter of the outer race 18 is spaced from the inner diameter of the annular pedestal 20 for defining an annular cavity for continuously receiving oil in the customary manner. This defines the viscous damper. The side edges are sealed by piston rings 22.

Pedestal 20 is supported in position by hairspring 24 which has one leg 26 grounded. Hairspring 24 carries a pair of concentric cylindrical surfaces 30 and 32 for accommodating the friction damper generally illustrated by reference numeral 34. The friction damper comprises axially aligned friction plates or discs 36 and 36A that surround the shaft 10. The outer diameter of friction plates 36 is snugly fitted onto the surface 30 and the inner diameter of alternate friction plates 36A is snugly fitted on the cylindrical surface 32. The plates are axially loaded against spring 44 projecting inwardly from surface 30 by load spring 40 which is preset by the locking nut 42. The locking nut 42 is torqued so that the friction damper is rendered inoperative until a certain load beyond that handled by the viscous damper is exceeded, but allows recentering of the plates when the load subsides.

It is apparent from the foregoing that the friction damper is in series relationship to the viscous damper and operates to handle different ranges of loads caused by certain imbalance characteristics of the engine's rotor supported thereby, particularly the imbalance loads occasioned by a bowed rotor.

Slots or apertures 50 are located in the friction plates at alternating locations to allow for the passage of oil continuously admitted thereto so as to prevent overheating of the friction plates.

As is apparent from the foregoing, the friction plates 36 and 36A will rub together when the viscous damper design loads are exceeded, causing the support to deflect. Resistance to the load is provided by the friction force between plates which results from the force normal to the rubbing surfaces. This normal force, which is necessary to produce the frictional force, is provided by the spring and is disposed between the nut and friction plates to provide a known normal load.

The hairspring 24 serves to restore the friction plates 36 and 36A back to the center position as shown in the sole FIGURE. Hence, when this force manifested by an imbalance of the rotor exceeds a predetermined value, the centering spring deforms and simultaneously causes the friction plates to displace and dissipate that imbalanced load. When the load subsides the displaced spring returns back to its original position and concurrently restores the friction plates to the center position. Obviously, it is not significant that the plates be centered or that they be returned to the original position.

It should be understood that the invention is not limited to the particular embodiments shown and described herein, but that various changes and modifications may be made without departing from the spirit and scope of this novel concept as defined by the following claims.

We claim:

1. For a rotor rotatably supported by a bearing, first damping means having a fluid cavity and fluid therein surrounding said bearing and damping a first magnitude of vibrations, a second damping means having a plurality of axially juxtaposed circular plates surrounding said fluid cavity in a predetermined centered position and being in friction relationship with each other, connection means serially interconnecting said first damping means and said second damping means including resilient means, said resilient means responding solely to a second magnitude of vibrations exceeding the first magnitude of vibrations for displacing alternate friction plates in a direction that is opposite and normal to each adjacent friction plate, and a loading spring for imposing a load axial to said plates and the load thereby being selected so that said resilient means restores said plates to their predetermined centered position.

2. For a rotor as in claim 1 wherein said friction plates are concentrically disposed relative to said first damping means.

3. For a rotor as in claim 1 including means for adjusting the load between adjacent friction plates.

4. In combination, a bearing rotatably supporting a rotor, said bearing including an inner race, an outer race and a plurality of circumferentially spaced rollers sandwiched therebetween, first damping means having a fluid cavity in the outer diameter of said outer race and fluid therein surrounding said rollers and damping a first magnitude of vibrations, a second damping means having a plurality of axially juxtaposed circular friction plates surrounding said fluid cavity and being in friction relationship with each other and being at a predetermined centered position, connection means serially interconnecting said first damping means and said second damping means including a hairspring, said hairspring responding solely to a second magnitude of vibrations exceeding the first magnitude of vibrations for displacing alternate friction plates in a direction that is opposite and normal to adjacent friction plates, and a spring urging said friction plates against each other to impose a load resisting sliding movement relative to each other, the force of said spring being selected to permit said hairspring to recenter said friction plates to said predetermined centered position when the load causing said second magnitude of vibrations subsides.

5. In combination as in claim 4 wherein said circular plates are concentrically disposed relative to said inner race and said outer race.

* * * * *